United States Patent Office 2,780,267
Patented Feb. 5, 1957

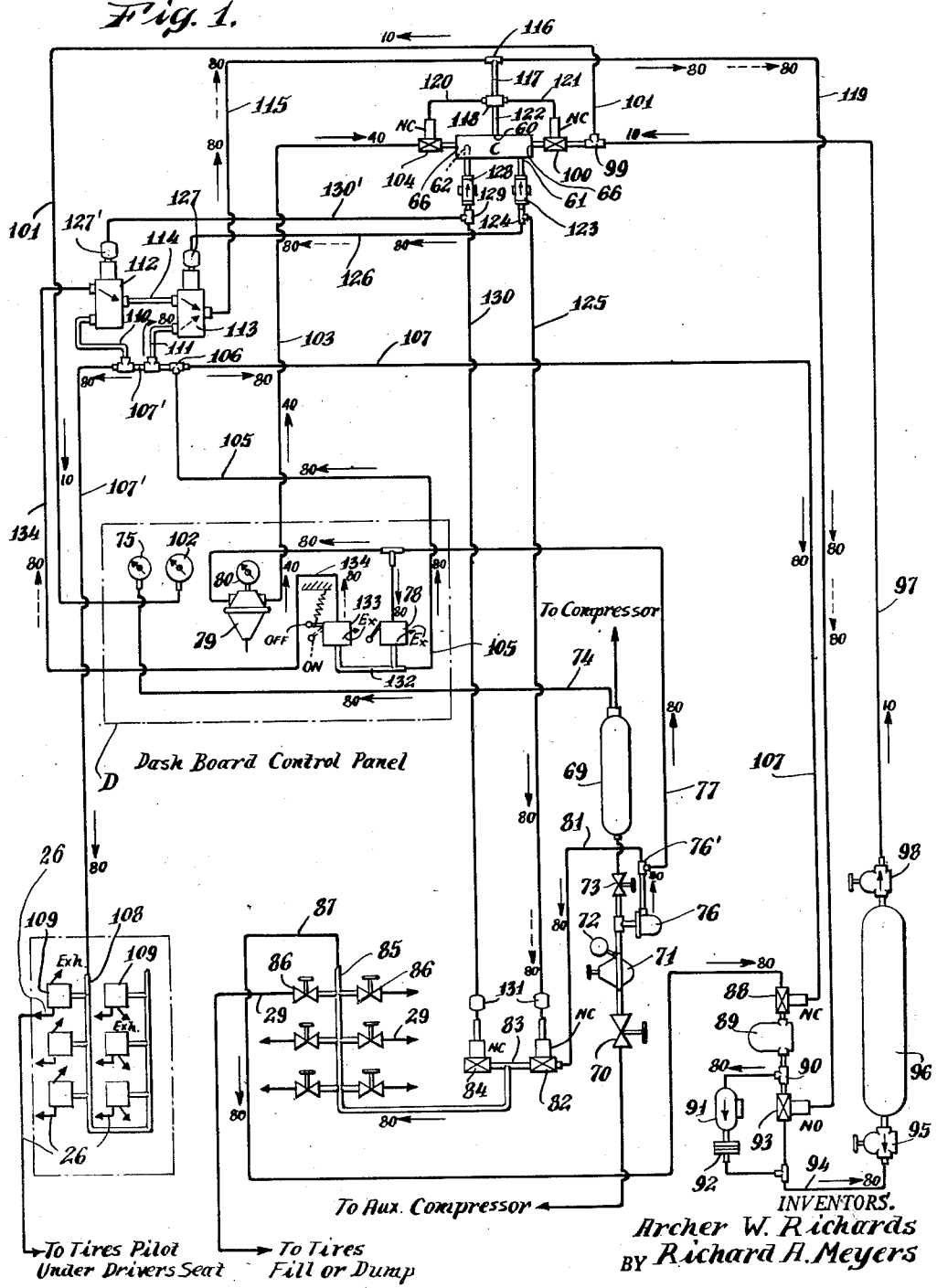

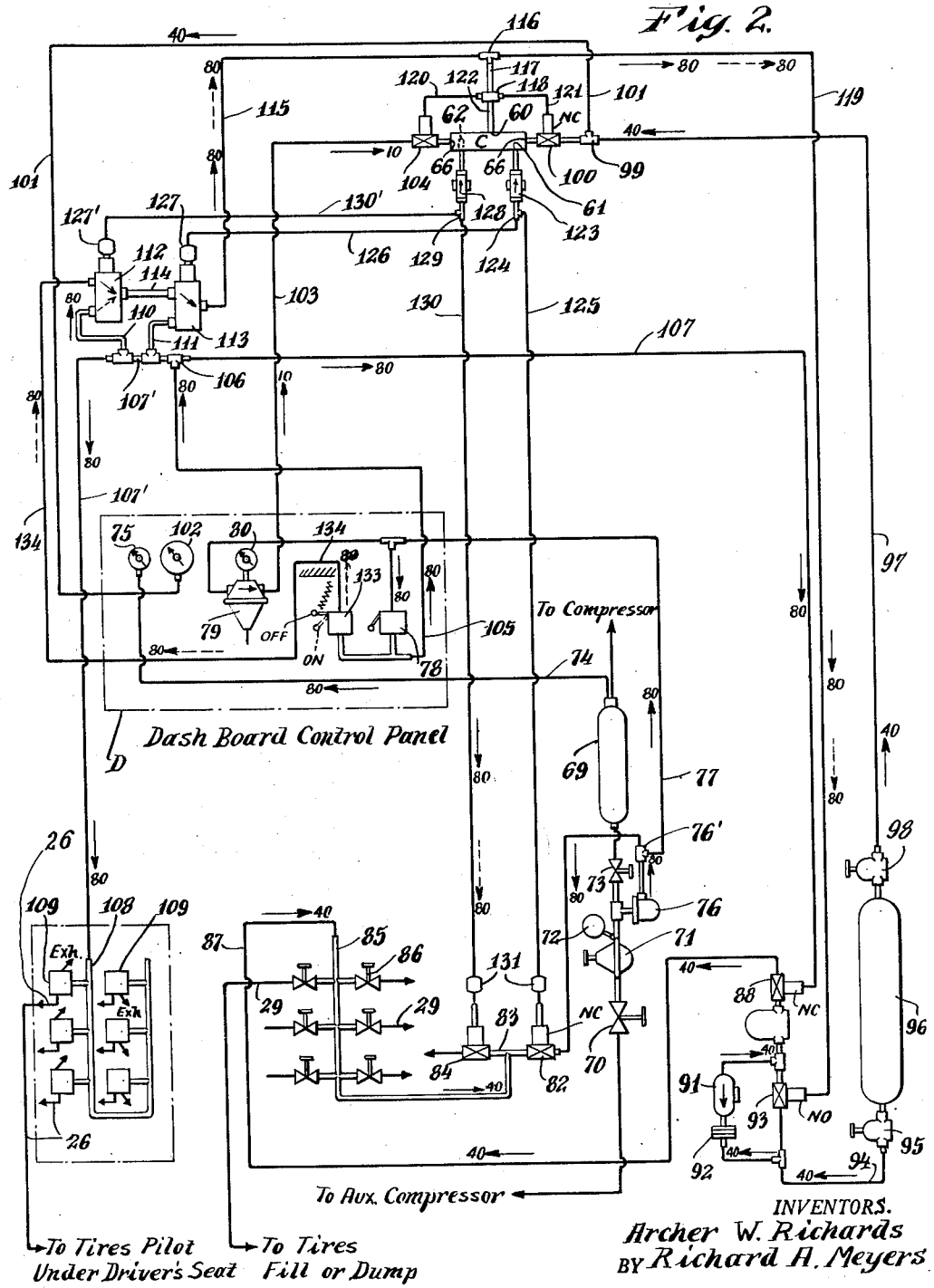

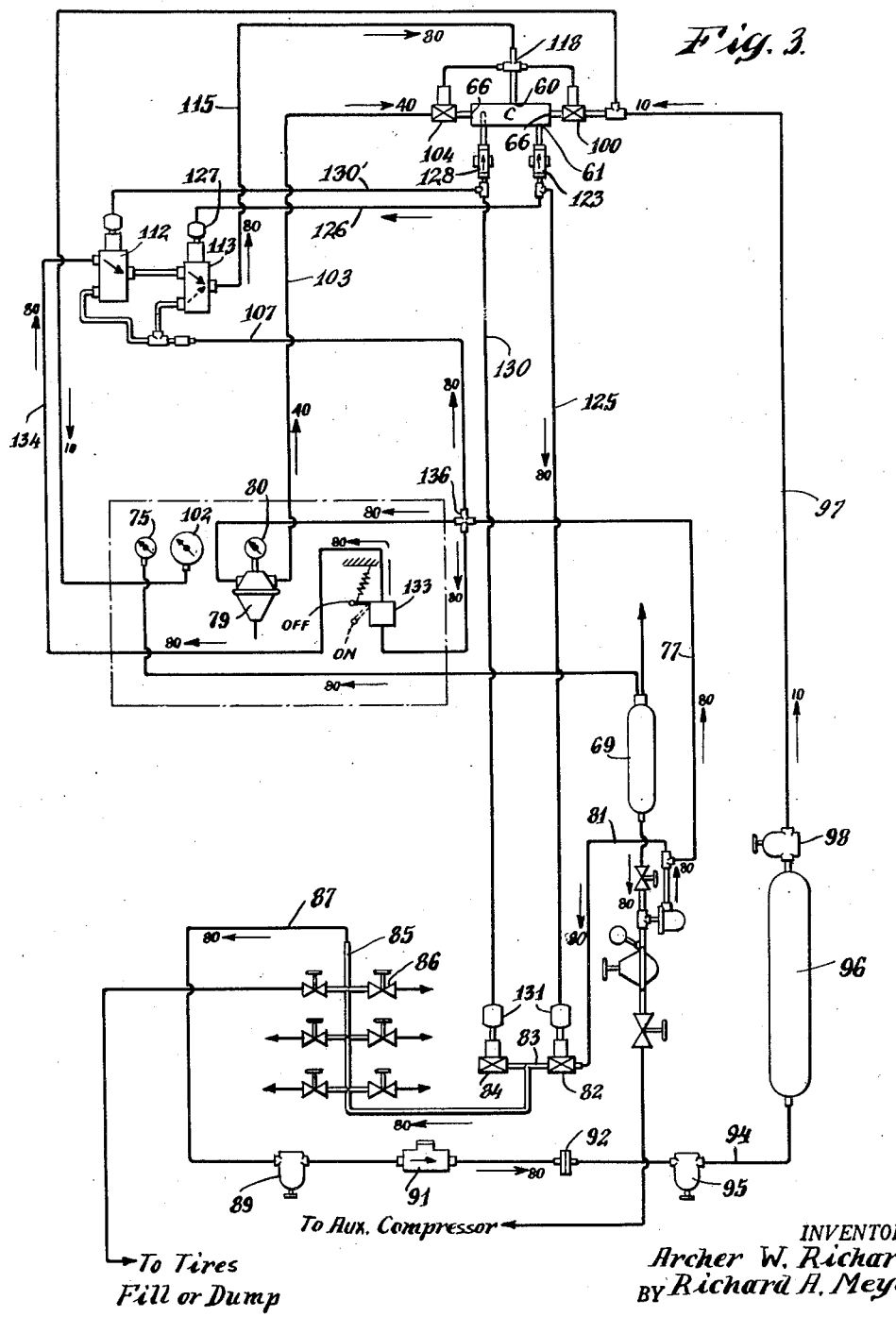

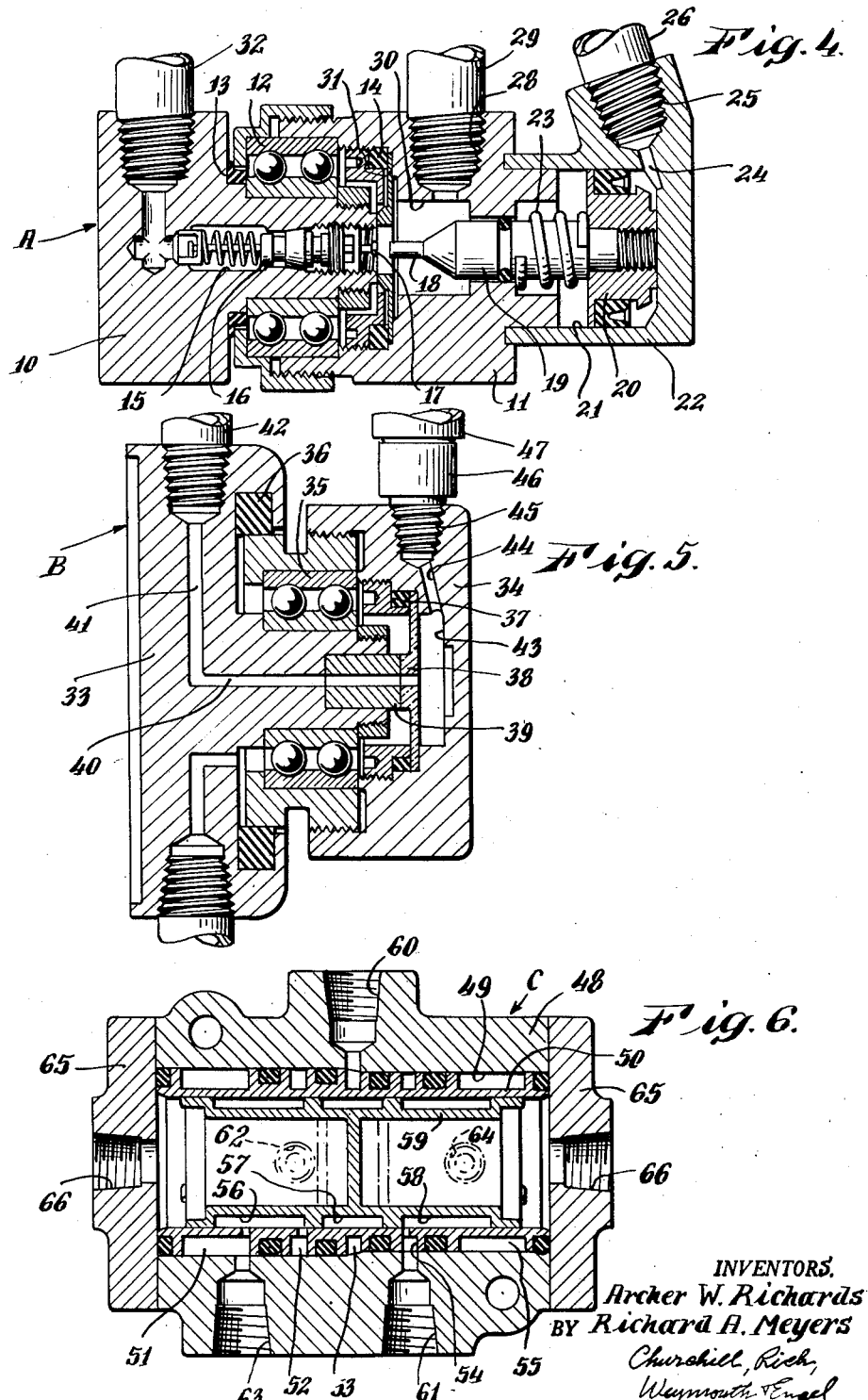

2,780,267

RUNNING INFLATION SYSTEM

Archer W. Richards, Chagrin Falls, Ohio, and Richard A. Meyers, Wyandotte, Mich., assignors to Scovill Manufacturing Company, Waterbury, Conn., a corporation of Connecticut Application December 1, 1954, Serial No. 472,308

14 Claims. (Cl. 152—417)

The present invention relates to a system and apparatus for rapidly inflating and deflating the pneumatic tires on a vehicle to any pre-selected pressure while the vehicle is in motion or at rest, and constitutes an improvement upon the system and apparatus disclosed in United States Letters Patent to Williams, No. 2,685,906, dated August 10, 1954.

In the operation of motor driven vehicles, different pressures are required in the pneumatic tires on different terrains. Specifically, in the case of the military "DUKW" on an earthy beach, the tire pressure should be about 10 p. s. i.; on a coral beach, 30 p. s. i.; and at high speed on a good highway a tire pressure of 40 p. s. i. is specified. On other vehicles the conditions may vary but the pattern is similar. Due to the nature and service of the vehicle, it is often required that these changes in pressure take place while the vehicle is in motion.

Accordingly, the present invention has among its objects: (1) to provide a system and apparatus whereby the inflation and deflation of any or all of the tires on a vehicle can be controlled from the operator's station while the vehicle is in motion or at rest; (2) to rapidly and with accuracy inflate and deflate to any selected pressure one or a plurality of tires or containers; (3) to provide a system and apparatus wherein the thermal effect on the tire pressures during inflation and deflation can be quickly corrected; and (4) to provide a system and apparatus as set forth in (1) and (2) above, whereby, when used for military application, should an exposed portion of the apparatus be shot away, the air pressure will be trapped in the tires.

The manner in which the foregoing and other objects of the invention, not specifically enumerated, are accomplished will be understood by those skilled in the art from the detailed description which follows, when considered in connection with the accompanying drawings, wherein:

Figure 1 is a schematic arrangement embodying the invention as applied to a tire pressure controlled system on a military vehicle known as a "DUKW," each of the wheels of which is equipped with a rotating joint assembly, the stationary unit of which has two air lines connected thereto and showing the directions of flow of air under pressure while inflating or increasing the pressure in the tires.

Fig. 2 is a schematic arrangement similar to Fig. 1, showing the directions of flow of air under pressure while deflating or reducing the pressure in the tires.

Fig. 3 is a schematic arrangement similar to Fig. 1 wherein the stationary units of the rotating joint assemblies on the wheels, each has a single air line connected thereto.

Fig. 4 is a diametrical section through a rotating joint assembly having two air lines connected thereto.

Fig. 5 is a diametrical section through a rotating joint assembly having a single air line connected thereto.

Fig. 6 is a diametrical section through a shuttle valve used in the system and apparatus.

The operation of the system and apparatus is dependent upon an understanding of the construction and operation of the rotating joint assemblies and the manner in which air under pressure is applied thereto and to the operation of the shuttle valve which governs the direction flow of air under pressure to or from the tires. The rotating joint assemblies per se are covered by patents and the shuttle valve per se constitutes the subject matter of a copending application hereinafter referred to and hence not claimed herein. The rotating joint assemblies and the shuttle valve will first be described.

Referring to Fig. 4, the rotating joint assembly A therein shown is described in detail and is claimed in the patent to Williams aforementioned. Briefly described, said assembly consists of a rotatable unit 10 and a stationary unit 11, there being mounted therebetween an antifriction bearing 12, a dust ring 13 and a packing ring 14 for preventing leakage of air during relative rotation of the units. The rotatable unit 10 has a blind axial bore 15 within which is mounted a valve core 16 having a pin 17 adapted to be unseated by a valve unseating member 18 carried by a plunger 19 attached to a piston 20 movable within a bore 21 of a cylinder 22 forming part of the stationary unit 11. The piston 20 is normally held out of engagement with the valve pin by a coil-spring 23. A duct 24 leads from the interior of the cylinder 22 to an enlarged, internally threaded socket 25 within which is connected one end of an air line or hose 26. The stationary unit 11 is formed with a screw-threaded socket 28 adapted to accommodate an air line or hose 29 and the inner end of the socket 28 communicates with a chamber 30, which, in turn, communicates with the axial bore 15 in the rotating unit. A substantially fluid-tight sliding engagement is provided between the rotatable unit and the stationary unit by a diaphragm 31. The bore 15 in the rotatable unit 10 is maintained in fluid-tight communication with the interior of a tire (not shown) through a conduit 32.

The rotating joint assembly B shown in Fig. 5 may be the same as shown in Fig. 4 of the aforementioned patent to Williams, No. 2,685,906, or in simplified form, as shown in the patent to Williams, No. 2,107,405. Suffice to say that it consists of a rotatable unit 33 and a stationary unit 34, the units being held in relative rotating, fluid-tight engagement by an anti-friction bearing 35, a dust ring 36, a packing ring 37 and an anti-friction diaphragm 38 engaging the outer end of an anti-friction plug 39 axially mounted in the rotatable unit 33. The rotatable unit is formed with an axial duct or passageway 40 which extends through the plug 39 and the diaphragm 38 and communicates through a radial duct 41 and a conduit 42 with the interior of the tire (not shown). The stationary unit 34 has a chamber 43, a communicating duct 44, and a socket 45 in which is mounted a fitting 46 connected to a conduit or air line 47.

Referring to Fig. 6, the shuttle valve C which, per se, forms the subject matter of a co-pending application in the name of Archer W. Richards, Ser. No. 465,475, filed October 29, 1954, consists essentially of a body 48 having a bore 49 therethrough, within which is mounted a sleeve 50 having a plurality of annular, leak-tight chambers 51, 52, 53, 54 and 55, each formed with a plurality of circumferential, angularly spaced openings in their bases adapted to establish fluid communication between annular passages 56, 57 and 58 in a shuttle spool 59, and an inlet port 60, outlet ports 61 and 62 and exhaust ports 63 and 64 formed in the body depending upon the position of the shuttle spool within the sleeve 50. A pair of end plates 65 close off the ends of the body and serve to hold the sleeve 50 therein and limit the movement of the shuttle spool when the latter is subjected to unbalanced pressures admissible to the shuttle through the ports 66.

Referring now to Figs. 1 and 2 of the drawings, which disclose an embodiment of the invention applied to vehicles, the wheels of which have rotating joint assemblies as shown in Fig. 4 and which are substantially identical except for the arrows indicating the directions of flow of air under pressure under different conditions, a source of fluid or air under pressure is maintained in a reservoir tank 69 which may be supplied with air under pressure from a compressor (not shown) or from an auxiliary compressor (not shown). Air from the auxiliary compressor when used passes through a manually controlled globe valve 70, a pressure regulator 71 having a pressure gauge 72 and through a second globe valve 73. A conduit 74 leads from the reservoir 69 to a pressure gauge 75 mounted on a dash board D. Air under pressure from the reservoir 69, which may be termed "line pressure" is withdrawn from the tank 69 by passing through the globe valve 73 and thence through a filter and water trap 76, and then divides in passing through a T-fitting 76' to one branch of which is connected a conduit 77 leading (a) to the induct port of a three-way equalizer valve 78; and (b) to the induct port of a pressure regulator 79 equipped with a pressure gauge 80; and to the other branch of which is connected a conduit 81 leading to a normally closed two-way pilot valve 82 and in turn, through a branch fitting 83 to (a) a normally closed pilot operated valve 84 and (b) to a fill or dump manifold 85 which controls the inflation and deflation of the various tires through conduits 29 and manually controlled valves 86. The manifold 85 in turn, through a conduit 87, connects with a normally closed two-way pilot valve 88, thence through a filter 89 and thence divides through a T fitting 90 (a) to a flow control valve 91 having free flow in the direction of the arrow thereon, and restricted flow in the opposite direction, and thence through a fixed orifice assembly 92; and (b) from the T fitting 90 to a normally open two-way, pilot-operated valve 93 and thence from the fixed orifice assembly 92 to the pilot-operated valve 93 through a conduit 94 which also connects the orifice assembly with a filter 95 and through said filter with a pressure control tank 96. On the opposite end of the pressure control tank 96 a conduit 97 which includes a filter 98, leads to a T fitting 99, one branch of which is connected to a normally closed, two-way pilot valve 100 and the other branch of which connects through a conduit 101 with a pressure gauge 102 mounted on the dash board for indicating the pressure within the pressure control tank 96.

The educt port of the pressure regulator 79 is connected by a conduit 103 with a normally closed two-way, pilot-operated valve 104. The educt ports of the pilot valves 100 and 104 connected with the opposite ends of the shuttle valve C to apply static pressure to the opposite sides or ends of the shuttle spool 59 in the shuttle valve, see Fig. 6.

The educt port of the three-way equalizer valve 78 connects through a T fitting (a) with a conduit 105 which connects with a T fitting 106, one branch of which connects with a conduit 107 leading to the pilot of the normally closed two-way, pilot valve 88 while the other branch of the T fitting 106 connects with a conduit 107' connected to a manifold 108, each of the branch lines from which connects with a three-way valve 109, which, in turn, through a conduit 26 (Fig. 4), establishes fluid communication with the chamber in back of the piston 20 of each stationary unit of the rotating joint assembly A to operate the valve unseating member 18 thereof to unseat the tire valve 16 and thereby fill the chamber 30 with air under pressure from the tire. Within the conduit 107' is a pair of tap-off conduits 110 and 111 which connect respectively with the normally closed induct port of a pair of three-way pilot-operated valves 112 and 113 connected in series, through a connecting duct 114. The educt port of the valve 113 connects through a conduit 115 with a T fitting 116, one branch of which through a conduit 117 connects with a cross-fitting 118 and the other branch of which connects through a conduit 119 with the pilot of the normally open pilot-operated valve 93. The cross-fitting 118 through a conduit 120, leads to the pilot of the pilot-operated valve 104 and a second conduit 121 leads to the pilot of the pilot-operated valve 100 and through a third conduit 122 connects with the inlet port 60 of the shuttle valve C. An outlet port 61 of the shuttle valve connects with a flow control valve 123 having free flow in the direction of the arrow thereon and restricted flow in the opposite direction and said valve 123, in turn, is connected to a T fitting 124, one branch of which connects with a conduit 125 which leads to the pilot of pilot-operated valve 82 and the other branch of which connects with a conduit 126 which leads to the pilot of valve 113 provided with a quick exhaust valve 127. The second outlet 62 of the shuttle valve connects with a flow control valve 128 having free flow in the direction of the arrow indicated thereon and restricted flow in the opposite direction, and said valve connects with a T fitting 129, one branch of which connects with a conduit 130 which leads to the pilot of the pilot valve 84, and the other branch of which connects with a conduit 130' which leads to the pilot of pilot-operated valve 112 which is fitted with a quick exhaust valve 127'. Associated with each of the pilot valves 82 and 84 is a quick exhaust valve 131.

A second conduit 132 leads from the educt port of the three-way equalizer valve 78 to the induct port of a three-way operating valve 133, the educt port of which connects through a conduit 134 with the normally open induct port of the pilot-operated valve 112.

As described hereinbefore, two sources of air are available for supplying air to the reservoir tank 69, which sources may be used independently or conjointly, depending upon the amount of air per minute which is to be delivered from the tank to the tires.

With the apparatus as hereinbefore described mounted on a "DUKW," let it be assumed that it is desired to inflate all the tires from 10 to 40 p. s. i. To accomplish this, the three-way equalizer valve 78 is first opened. This admits air line pressure from the reservoir tank 69 through the conduit 77, to the valve 78 and through the conduits 105 and 107' to the manifold 108 and through the conduits 26 to open the tire valve in each of the rotating joints A and permit the pressure from the tires to equalize in the manifold 85 through the valves 86. It is assumed that the valve 78 will be open whenever the vehicle is in operation, thus permitting a constant equalized condition to prevail among all six tires. This equalized pressure will be indicated on the gauge 102, on the dash board, connected with the control tank 96. Full line pressure of 80 p. s. i. passes through said equalizing valve when it is opened and becomes available at the induct port of spring-loaded, three-way valve 133. After leaving the equalizer valve 78, line pressure air also goes through conduit 107 to pressurize the pilot of the normally closed pilot-operated valve 88, thus opening it and permitting the equalized pressure from the manifold 85 to enter and equalize with the air in the pressure control tank 96 in a manner soon to be explained. This equalized air, which has been assumed to be 10 p. s. i, now becomes available at the normally closed pilot-operated valve 100 at the right end of the shuttle valve C. After leaving the equalizer valve 78, line pressure air also goes through the conduits 110 and 111 to the pilot-operated valves 112 and 113 connected in series, but it stops there until the pilot of either one of said pilot-operated valves is pressurized.

Pressure regulator 79 is now set at 40 p. s. i. This pressure is indicated on gauge 80. The line pressure, assumed to be 80 p. s. i., which enters the regulator is reduced to 40 p. s. i. which fills the line up to the normally closed pilot-operated valve 104 at the left end of the shuttle valve C.

To start the inflate operation, the spring-loaded lever of the three-way operating valve 133 is depressed and held down for approximately two seconds, and then released. In the period during which the valve 133 is open, the following functional operations will ensue, to wit: line pressure air which came through the valve 133 now passes through the three-way, pilot-operated valves 112 and 113 connected in series, as shown by the full arrows thereon, and line pressure now reaches the normally open pilot-operated valve 93, and closes it. This means that when the inflate air goes into the six tires via the inflate-deflate manifold 85 it will have to pass through the flow control valve 91 in the direction of the arrow thereon and through the fixed orifice assembly 92 to increase the pressure within the pressure control tank 96. Flow through the restriction of the fixed orifice assembly 92 is such that the pressure in the control tank 96 is the same as the static pressure in any or all of the six tires at the same time. The air leaving the pilot-operated valves 112 and 113 connected in series also opens the two normally closed pilot-operated valves 100 and 104, thus admitting air pressure at 40 p. s. i. into the left end of the shuttle valve C and also air pressure at 10 p. s. i. into the right end of the shuttle valve. This causes the shuttle to move to the right or low pressure end, whereupon line pressure entering through ducts 117 and 122 also enters the inlet 60 of the shuttle valve and, since the shuttle is at the right end, this air is routed through the shuttle valve outlet port 61, thence through flow control valve 123 (where the flow is slightly reduced) and from there to the pilot of pilot-control valve 113 whose piston is thereby moved downward causing flow, which was coming from the other pilot-control valve 112, to be stopped, and admitting line pressure which is at the lower normally closed induct port of said valve to pass through valve 113. All of these operations take place in the two seconds or less that the three-way valve 133 is open. Air leaving the shuttle valve C by way of the flow control valve 123 also reaches the pilot of the normally closed pilot-operated valve 82 and opens said valve admitting the main inflate full line pressure from the tank 69 into the manifold 85 and through the open valves 86 through the ducts 29 into the tires and simultaneously admits the equalized pressure in the tires to flow to the pressure control tank 96 through the fixed orifice assembly 92, since the normally open pilot valve 93 is now closed. When the air in the pressure control tank reaches a pressure between 40 and 41 p. s. i. (which is also the pressure in each of the six tires) the shuttle, which was at the right end of the shuttle valve C, leaves that position and is moved to the left. The instant this happens, pilot valve 113 and pilot valve 82 close, exhausting through the quick exhaust valves 127 and 131, respectively, and the air in the lines to these valves exhausts through the exhaust port 64 of the shuttle valve. If the shuttle tends to go to the left end of the shuttle valve (which it probably will), the sequence cannot be repeated because the instant the pilot of valve 113 becomes unpressurized and the piston returns to its original position, through flow through said valve which was keeping the inflate operation in action, is cut off and through flow (solid arrows on the valves 112 and 113) which started the inflate operation, only has air while operating valve 113 is held in a depressed position. When this operation is completed, the desired pressure, read on gauge 80 and actually equalized tire pressure read on gauge 102 will be the same.

On Fig. 1 of the drawings we have indicated by designated arrows, the pressures in the various lines or conduits at an assumed inflate operation from 10 to 40 p. s. i. at the instant of start of inflation, the operating valve 133 having been just closed, after having been held open for two seconds. The line pressure of 80 p. s. i. is designated by a solid arrow ———→ 80; the line pressure flowing through the conduits while the operating valve 133 is temporarily held open is designated by a broken arrow — — — — → 80; a pressure of 10 p. s. i. by an arrow ————→ 10; and a pressure of 40 p. s. i. by an arrow ————→ 40.

Let it now be assumed that the tires are inflated to 40 p. s. i. and it is desired to deflate them to 10 p. s. i. The procedure is the same as for inflating. The equalizer valve 78 must be open and the pressure regulator 79 is now set at 10 p. s. i. This makes air at 10 p. s. i. available at the normally closed pilot-operated valve 104 at the left end of the shuttle valve C. If the tires contain air at 40 p. s. i., the pressure control tank 96 also contains air at 40 p. s. i. and air at this same pressure is at the normally closed pilot operated valve 100 at the right end of the shuttle valve C. To start the deflate operation, the spring-loaded operating valve 133 is depressed and held open for about two seconds and then released. In the interval that valve 133 is open, the following functional operations will ensue, reference being made to Fig. 2 of the drawings wherein the pressures in the various lines are designated at the instant of start of deflation, the operating valve 133 having been just closed. When normally open pilot-operated valve 93 is closed, deflate air leaving the pressure control tank 96 must first come through filter 95 and pass through the fixed orifice assembly 92 where its flow is restricted and through flow control valve 91 where it is further restricted. Flow out of air from the pressure control tank is at the same rate as flow out from the six tires, and again the pressure in the pressure control tank 96 is the same as in each of the six tires at all times. When air from the two pilot operated valves 112 and 113 opens the two normally closed pilot-operated valves 100 and 104, air at 10 p. s. i. is admitted to the left end of the shuttle valve C and 40 p. s. i. is admitted to the right end of the shuttle valve C. This sends the shuttle to the left end and line pressure air, which enters the inlet 60 is routed through and comes out of outlet 62 and passes through control valve 128 and to the pilot of pilot controlled valve 112, the one that did not operate for the inflate operation. Action on said valve 112 is the same as on valve 113 during inflation. Accordingly, air leaving shuttle valve C through outlet 62 also reaches the normally closed pilot-operated valve 84 and opens said valve. Valve 84 is the main dump valve. Hence, air from the tires and from the pressure control tank 96 passes through manifold 87 and dumps through valve 84. When the air in the pressure control tank 96 reaches slightly under 10 p. s. i. the shuttle leaves the left end of the shuttle valve C and the operations involved in stopping deflation are the same as those involved in stopping inflation. Again, when the deflate operation is completed, desired pressure read on gauge 80 and actual equalized pressure read on gauge 102 will be the same.

If at any time, when the vehicle is in operation with the two air line connections to the rotating joint assemblies and assuming that the equalizer valve 78 is open, there is a discrepancy between the readings on gauges 75 and 79, whether it be a build-up of tire pressure due to heating, or a drop in tire pressure due to cooling or leakage, all one need do is to depress the operating valve 133 for a second or so and the tires will either be inflated or deflated, so that their pressure will agree with the desired pressure.

When the three-way equalizing valve 78 is returned to its off position, the air in the pilot manifold 108 and the air in the pilot lines 26 to all six rotating joint assemblies is exhausted. This permits all six valves 15 to close. Air from the pilot of the normally closed pilot-operated valve 88 is also exhausted and this seals off the pressure control tank from the inflate-deflate manifold 85. It will thus be seen that by manipulating the manually controlled valves 86 any one or more of the tires may be inflated or deflated as desired.

Where rotating joint assemblies of the type shown in Fig. 5 are employed, i. e., a single air line to the tires, the pilot valves 109 to the tire valves are eliminated as are also the normally open three-way equalizer valve 78 and the pilot-operated valves 88 and 90, reliance is made upon three-way operating valve 133 for inflating and deflating as will be understood from the schematic showing in Fig. 3 and the following explanation.

With the system and apparatus of Fig. 3 let it be assumed it is desired to inflate all the tires from 10 p. s. i. to 40 p. s. i. To accomplish this the pressure regulator valve 79 is set at 40 p. s. i. and the three-way spring controlled operating valve 133 is depressed and held open for about two seconds. Line pressure air at 80 p. s. i. from the reservoir tank 69 in passing through cross fitting 136 is now available at the pressure regulator valve 79, at the operating valve 133 and at the closed ports of pilot operated valves 112 and 113. After leaving the regulator valve 79, air at 40 p. s. i. becomes available at the normally closed pilot operated valve 104. After leaving the operating valve 133 line pressure air passes through line 134 and through the open ports of valves 112 and 113 in series and through line 115 to cross fitting 118 to pressurize the pilots of valves 100 and 104 and to the inlet 60 of shuttle valve C. Static air pressure at 10 p. s. i. from the pressure control tank 96 is at the normally closed pilot operated valve 100. When the pilots of valves 100 and 104 are pressurized the air pressure at 40 p. s. i. admitted to the left end of the shuttle valve will overbalance the pressure of the air at 10 p. s. i. admitted to the right end and hence the shuttle will move to the right and establish fluid passage from the inlet port 60 of shuttle valve C to the outlet port 61 and from there to pressurize the pilot of valve 113 and the pilot of valve 82. When the pilot of valve 113 is pressurized, the upper induct port will close and the lower induct port will be opened to admit line pressure air from line 107 through pilot controlled valve 113 to maintain the pressurization of the pilots of valves 100, 104, 113 and 82. Pilot operated valve 82 being held open, line pressure air will be admitted from reservoir 69 through conduit 81, valve 82, conduit 83 to manifold 85 to flow into the tires and also to the pressure control tank 96 to build up the pressure therein through conduit 87, filter 89, flow valve 91, fixed orifice assembly 92 and filter 95. When the air in the pressure control tank 96 reaches a pressure of between 40 and 41 p. s. i., the shuttle will be moved to the left and the instant that happens, pilot valves 82 and 113 close, exhausting through the quick exhaust valves 127 and 131 respectively, and the air in these lines exhaust through exhaust port 64 in the shuttle valve C. If the shuttle tends to go to the other end of the shuttle valve (which it probably will) the sequence cannot be repeated because the instant the pilot of valve 113 becomes unpressurized and the piston therein returns to its original position, through flow through said valve 112 which was keeping the inflate operation in action, is cut off and through flow which started the inflating operation only has air while the operating valve 133 is held open. When this operation is completed, the desired pressure, read on the gauge 80 and actually equalized tire pressure, read on the gauge 102 will be the same.

From the foregoing detailed description it will be appreciated that the system and apparatus disclosed will accomplish the various objects recited in the opening statement of this specification and although we have shown and described two embodiments of our invention, it will be understood that changes may be made therein within the range of engineering skill without departing from the spirit of the invention as hereinafter claimed.

What we claim is:

1. A system for inflating a container to a predetermined pressure, comprising a container to be inflated, a source of fluid under pressure; a pressure control tank; a pressure regulator valve; a shuttle valve; conduits connecting the source of fluid pressure (a) with the container to be inflated, (b) with the inlet of the pressure regulator valve, and (c) with the inlet port of the shuttle valve; a normally closed pilot operated valve in the conduit connecting the source of fluid under pressure with the container; a conduit connecting the outlet of the shuttle valve with the pilot of the pilot operated valve; a conduit connecting the pressure control tank to one end of the shuttle of the shuttle valve; a conduit connecting the outlet of the pressure regulator valve to the other end of the shuttle of the shuttle valve; and means for establishing the static pressures from the control tank and from the outlet of the pressure regulator valve on the opposite ends of the shuttle valve to operate the shuttle therein and thereby control the pilot operated valve in the conduit connecting the source of fluid pressure with the container.

2. A system for controlling the pressure in a container, comprising a container within which the pressure is to be controlled; a source of fluid under pressure; a pressure control tank; a pressure regulator valve; a shuttle valve having an inlet port and axially spaced outlet ports controlled by the position of the shuttle within the shuttle valve; conduits connecting the source of fluid under pressure (a) with the container, (b) with the inlet of the pressure regulator valve, and (c) with the inlet port of the shuttle valve; a pair of normally closed pilot operated valves in the conduit connecting the source of fluid pressure with the container, a pair of conduits connecting the outlets of the shuttle valve with the pilots of the pilot operated valves a conduit connecting the pressure control tank to one end of the shuttle valve; a conduit connecting the outlet of the pressure regulator valve to the other end of the shuttle valve; and means for establishing the static pressures from the control tank and from the outlet of the pressure regulator valve on the opposite ends of the shuttle valve to operate the shuttle therein in the direction of the overbalanced pressure and thereby control one of the pilot operated valves in the conduit connecting the source of fluid pressure with the container and thereby shut off flow of fluid to or from the container.

3. A system for inflating a container to a predetermined pressure, comprising a container to be inflated; a source of fluid under pressure; a pressure control tank; a shuttle valve; a pair of normally closed pilot-operated valves controlling admission of fluid to the opposite ends of the shuttle of the shuttle valve; a three-way equalizer valve; a pressure regulator valve; a three-way pilot-operated valve; a normally closed two-way pilot-operated valve; conduits leading from the source of fluid under pressure (a) to the three-way equalizer valve, (b) to the induct port of the regulator valve, (c) to the normally closed port of the three-way pilot-operated valve, and (d) to the container by way of the second recited normally closed two-way pilot-operated valve; a conduit leading from the three-way equalizer valve to the open induct port of the three-way pilot-operated valve; a conduit leading from the educt port of the three-way pilot-operated valve to the inlet port of the shuttle valve and to the pilots of the pair of normally closed pilot-operated valves at the opposite ends of the shuttle valve; a conduit leading from the educt port of the regulator valve to the inlet port of one of the pair of pilot-operated valves at one end of the shuttle valve; conduits leading from the pressure control tank, one to the inlet port of the other of the pair of pilot-operated valves at the other end of the shuttle valve and another to the container to be inflated; the shuttle valve having axially spaced outlet ports controlled by the position of the shuttle within the shuttle valve; and conduits leading from one of said outlet ports of the shuttle valve to the pilot of the three-way pilot-operated valve and to the pilot of the second recited normally closed two-way pilot-operated valve interposed in the conduit leading from the source of fluid under pressure to the container; whereby, when it is desired to inflate the container to a predetermined pressure, the regulator valve is set to said desired pressure and the three-way equalizer valve is opened for a brief interval, whereupon the following functional operations will ensue: (1) fluid under pressure from the source will flow through the three-way pilot-operated valve to pressurize the pilots of and open the first recited pair of normally closed pilot-operated valves leading to the opposite ends of the shuttle; and (2) permit fluid under pressure from the source to pass through the shuttle valve to pressurize the pilot of and open the second recited normally closed pilot valve in the conduit leading from the source of fluid under pressure to admit fluid therefrom to the container and to the pressure control tank; and to also pressurize the pilot of the three-way pilot-operated valve, thereby establishing flow of fluid under pressure from the source through said last-mentioned valve when the three-way equalizer valve is closed; and while the container and the pressure control tank are receiving fluid pressure, the increasing pressure from the control tank will be acting on one end of the shuttle valve; and when said pressure overbalances the pressure acting on the opposite end of the shuttle valve, will cause the shuttle to move in the direction of the overbalanced pressure to cut off the static fluid pressure acting on the pilot of the then open second recited pilot-operated valve in the conduit leading from the pressure source to the container, and thereby shut off the flow of fluid under pressure from the source to the container.

4. A system according to claim 3, wherein the conduit leading from the pressure control tank to the container includes a fixed orifice assembly for insuring that at all times the fluid pressure in the pressure control tank is the same as the static pressure in the container.

5. A system according to claim 3, wherein the conduit leading from the pressure control tank to the container includes a speed control valve and a fixed orifice assembly in series for insuring that at all times the fluid pressure in the pressure control tank is the same as the static pressure in the container; the speed control valve permitting free fluid flow in one direction and restricted flow in the opposite direction.

6. A system for controlling the pressure in a container, comprising a container within which the pressure is to be controlled; a source of fluid under pressure; a pressure control tank; a shuttle valve; a first pair of normally closed pilot-operated valves controlling admission of fluid to the opposite ends of the shuttle of the shuttle valve; a three-way equalizer valve; a pressure regulator valve; a pair of three-way pilot-operated valves connected in series; a second pair of normally closed two-way pilot-operated valves; conduits leading from the source of fluid under pressure (a) to the three-way equalizer valve, (b) to the induct port of the regulator valve, (c) to the closed ports of the pair of three-way pilot-operated valves, and (d) to the container by way of one of the second pair of normally closed two-way pilot-operated valves; a conduit leading from the three-way equalizer valve to the induct port of the first of the pair of three-way pilot-operated valves connected in series; a conduit leading from the educt port of the second of the pair of three-way pilot-operated valves to the inlet port of the shuttle valve and to the pilots of the first pair of pilot-operated valves at the opposite ends of the shuttle valve; a conduit leading from the educt port of the regulator valve to the inlet port of one of the first pair of pilot-operated control valves at one end of the shuttle valve; conduits leading from the pressure control tank, one to the inlet port of the other of the first pair of pilot-operated valves at the other end of the shuttle valve, and another to the container within which the pressure is to be controlled; the shuttle valve having axially spaced outlet ports controlled by the position of the shuttle within the shuttle valve; conduits leading from one of said outlet ports of the shuttle valve, one to the pilot of the second of the pair of the three-way pilot-operated valves in series, and another to the pilot of one of the second pair of normally closed two-way pilot-operated valves interposed in the conduit leading from the source of fluid under pressure to the container; conduits leading from the other outlet port of the shuttle valve, one to the pilot of the first of the pair of three-way pilot-operated valves in series, and another to the pilot of the other of the second pair of normally closed two-way pilot-operated valves; whereby when it is desired to change the pressure of the fluid in the container to a predetermined pressure, the regulator valve is set to the desired pressure and the three-way equalizer valve is opened for a brief interval, whereupon the following functional operations will ensue: (1) fluid pressure from the source will flow through the pair of three-way pilot-operated valves in series to pressurize the pilots and open the valves controlled thereby of the first pair of normally closed two-way, pilot-operated valves leading to the opposite ends of the shuttle valve; (2) permit fluid under pressure from the source to pass through the shuttle valve to pressurize the pilot of one of the second pair of normally closed two-way pilot valves; and (3) to also pressurize one of the pilots of the pair of three-way pilot-operated valves connected in series, thereby establishing, depending upon whether the pressure in the container is to be increased or decreased, flow of fluid under pressure from the source through one of said two-way pilot-operated valves when the three-way equalizer valve is closed; and while the container and the pressure control tank are receiving or discharging fluid under pressure, the modified pressure from the control tank is acting on one end of the shuttle valve and when said pressure overbalances or is overbalanced by the pressure acting on the opposite end of the shuttle, the shuttle will move in the direction of the overbalanced pressure to cut off the static fluid pressure acting on the pilot of the pilot valve of the second pair of normally closed pilot-operated valves in the conduit leading from the pressure source to the container, and thereby shut off flow of fluid under pressure to or from the container.

7. A system according to claim 6, wherein quick exhaust means are provided for venting fluid pressure acting on the pilots of the three-way pilot-operated valves and the two-way pilot-operated valves in the conduit leading from the source of fluid pressure to the container.

8. A system according to claim 6, wherein the conduit leading from the pressure control tank to the container includes a fixed orifice assembly for insuring at all times that the fluid pressure in the pressure control tank is the same as the static pressure in the container.

9. A system for controlling the pressures in the tires on the wheels of a vehicle while the wheels are at rest or rotating, and wherein at each wheel a fluid tight rotating joint assembly is provided between a unit which is rotatable with the wheel and a unit which is stationary; comprising a manifold establishing fluid communication with each of the stationary units; a source of fluid under pressure; a pressure control tank; a shuttle valve; a first pair of normally closed two-way pilot-operated valves controlling admission of fluid to the opposite ends of the shuttle of the shuttle valve; a three-way equalizer valve; a pressure regulator valve; a pair of three-way pilot-operated valves connected in series; a second pair of normally closed two-way pilot-operated valves; conduits leading from the source of fluid under pressure (a) to the three-way equalizer valve, (b) to the induct port of the regulator valve, (c) to the closed ports of the pair of three-way pilot-operated valves, and (d) to the tires by way of one of the second pair of normally closed two-way pilot-operated valves; a conduit leading from the three-way equalizer valve to the induct port of the first of the pair of three-way pilot-operated valves connected in series; a conduit leading from the educt port of the second of the pair of three-way pilot-operated valves to the inlet port of the shuttle valve and to the pilots of the first pair of pilot-operated valves at the opposite ends of the shuttle; a conduit leading from the educt port of the regulator valve to one of the second pair of pilot-operated control valves at one end of the shuttle; conduits leading from the pressure control tank, one to the pilot-operated valve at the other end of the shuttle valve, and another to the manifold; the shuttle valve having axially spaced outlet ports controlled by the position of the shuttle within the shuttle valve; conduits leading from one of said outlet ports of the shuttle valve, one to the pilot of the second of the pair of the three-way pilot-operated valves in series, and another to the pilot of one of the second pair of normally closed two-way pilot-operated valves interposed in the conduit leading from the source of fluid under pressure to the manifold; and conduits leading from the other outlet port of the shuttle valve, one to the pilot of the first of the pair of three-way pilot-operated valves in series, and another to the pilot of the other of the second pair of normally closed two-way pilot-operated valves; whereby, when it is desired to change the pressure of the fluid in the tires to a predetermined pressure, the regulator valve is set to the desired pressure and the three-way equalizer valve is opened for a brief interval, whereupon the following functional operations will ensue: (1) fluid pressure from the source will flow through the pair of three-way pilot-operated valves in series to pressurize the pilots and open the first pair of two-way, pilot-operated valves leading to the opposite ends of the shuttle valve, (2) permit fluid pressure from the source to pass through the shuttle valve to pressurize the pilot of one of the second pair of normally closed two-way pilot valves, and (3) to also pressurize the pilot of one of the pair of three-way pilot-operated valves connected in series, depending upon whether the pressure in the tires is to be increased or decreased, thereby establishing flow of fluid under pressure from the source through said last-mentioned valve when the three-way equalizer valve is closed; and while the tires and the pressure control tank are receiving fluid pressure, the modified pressure from the control tank is acting on one end of the shuttle valve, and when said pressure overbalances or is overbalanced by the pressure acting on the opposite end of the shuttle, the shuttle will move in the direction of the overbalanced pressure to cut off the static fluid pressure acting on the pilot of the pilot valve of the second pair in the conduit leading from the pressure source to the tires, and thereby shut off flow of fluid under pressure from or to the tires.

10. The system according to claim 9, wherein the conduit leading from the control tank to the manifold includes a speed control valve and a fixed orifice assembly in series, the speed control valve permitting free flow of fluid in one direction and restricted flow in the opposite direction, and the fixed orifice is so chosen that at all times the pressure in the control tank is the same as the static pressure in the controlled tires.

11. A system for controlling the pressures in the tires on the wheels of a vehicle, while the wheels are at rest or rotating and wherein at each wheel a fluid-tight rotating joint assembly is provided between a unit which is rotatable with the wheel and a unit which is stationary, and each rotatable unit has a spring-closed check valve therein and each stationary unit has fluid pressure operable means for unseating said check valve; comprising a manifold adapted to establish fluid communication with each of the tires when the check valve of the rotating unit is unseated; a source of fluid under pressure; a pressure control tank; a shuttle valve; a pair of normally closed, pilot-operated valves controlling the admission of fluid to the opposite ends of the shuttle in the shuttle valve; a three-way equalizer valve and a three-way operating valve connected in series; the three-way equalizer valve being normally open and the three-way operating valve being normally closed; a regulator valve; a pair of three-way, pilot-operated valves connected in series; a pair of normally closed two-way, pilot-operated valves; conduits leading from the source of fluid under pressure (a) to the induct port of the normally open, three-way equalizer valve, (b) to the induct port of the pressure regulator valve, and (c) to the manifold by way of one of the pair of normally closed two-way, pilot-operated valves; conduits leading from the educt port of the normally open equalizer valve, (d) to the induct port of the normally closed operating valve, (e) to the fluid pressure operable means for unseating the check valves in the rotatable units, and (f) to the normally closed induct ports of the pair of three-way, pilot-operated valves connected in series; a conduit leading from the educt port of the second of the pair of three-way, pilot-operated valves connected in series; to the inlet port of the shuttle valve and also to the pilots of the pair of pilot-operated valves at the opposite ends of the shuttle valve; a conduit leading from the educt port of the regulator valve to one of the pilot-operated control valves at one end of the shuttle valve; conduits leading from the pressure control tank to the pilot-operated valve at the other end of the shuttle valve and to the manifold; the shuttle valve having axially spaced outlet ports controlled by the position of the shuttle within the shuttle valve; conduits leading from one of said outlet ports of the shuttle valve to the pilot of the second of the pair of three-way, pilot-operated valves in series, and to the pilot of one of the pair of normally closed, two-way, pilot-operated valves interposed in the conduit leading from the source of fluid under pressure to the manifold; conduits leading from the other outlet port of the shuttle valve to the pilot of the first of the pair of three-way, pilot-operated valves in series and to the pilot of the other of the pair of normally closed, two-way, pilot-operated valves interposed in the conduit leading from the source of fluid under pressure to the manifold; and a conduit leading from the educt port of the normally closed, three-way operating valve to the normally open induct port of the first of the pair of three-way, pilot-operated valves in series; whereby, when it is desired to change the pressure of the fluid in the tires to a predetermined pressure, the regulator valve is set to the desired pressure and the normally closed, three-way operating valve is opened for a brief interval, during which interval the following functional operations will ensue: (1) fluid pressure from the source will flow to and through the pair of three-way, pilot-operated valves in series to pressurize the pilots and open the valves leading to the opposite ends of the shuttle and also permit fluid pressure from the source to pass through the shuttle valve to pressurize the pilot of one of the normally closed, two-way, pilot-operated valves in the conduit leading from the fluid pressure source to the tire manifold; and (2) to pressurize the pilot of one of the pair of three-way, pilot-operated valves connected in series, depending upon whether the pressure in the tires is to be increased or decreased, and thereby establish flow of fluid under pressure from the source or from the tires through one of said two-way pilot-operated valves after the normally closed, three-way operating valve has been closed after having been temporarily opened; and while the tires and the pressure control tank are receiving or discharging fluid under pressure, the modified pressure from the control tank will act on one end of the shuttle in the shuttle valve, whereupon, when said pressure overbalances or is overbalanced by the pressure acting on the opposite end of the shuttle, the shuttle will move in the direction of the overbalanced pressure to cut off the static fluid pressure acting on the pilot of the pilot valve in the conduit leading from the pressure source to the tires and thereby shut off the flow of pressure from or to the tires.

12. A system according to claim 11 wherein a quick exhaust valve is connected to each of the pair of three-way, pilot-operated valves connected in series.

13. A system according to claim 11 wherein a quick exhaust valve is connected to each of the pair of normally closed two-way, pilot-operated valves in the conduit leading from the source of fluid pressure to the manifold for establishing fluid communication with each of the tires.

14. A system according to claim 11 wherein the conduit leading from the pressure control tank to the manifold includes a fixed orifice assembly for insuring that at all times the fluid pressure in the pressure control tank is the same as the static pressure in the tires.

References Cited in the file of this patent

UNITED STATES PATENTS 2,685,906     Williams _____ Aug. 10, 1954